Figure 1A:
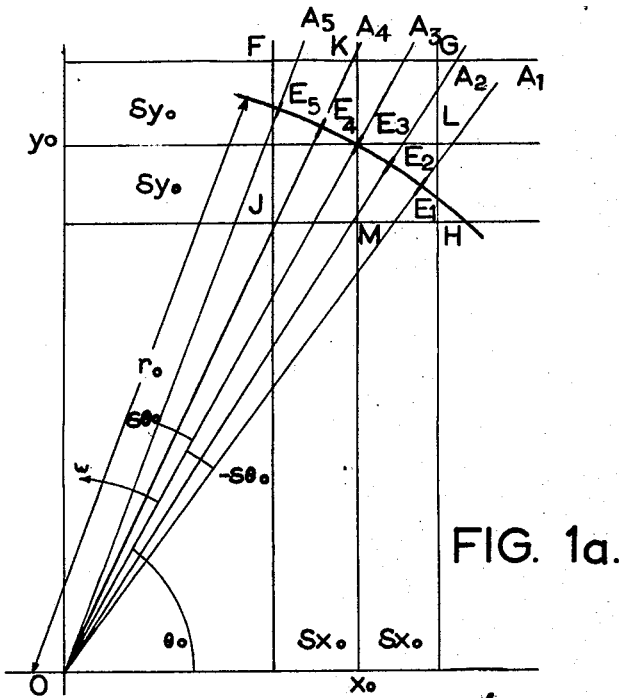

Feb. 9, 1960 E. L. C. WHITE 2,924,818
AUTOMATIC TRACKING CIRCUITS
Filed March 2, 1954 5 Sheets-Sheet 1

INVENTOR
E. L. C. White
ATTORNEYS

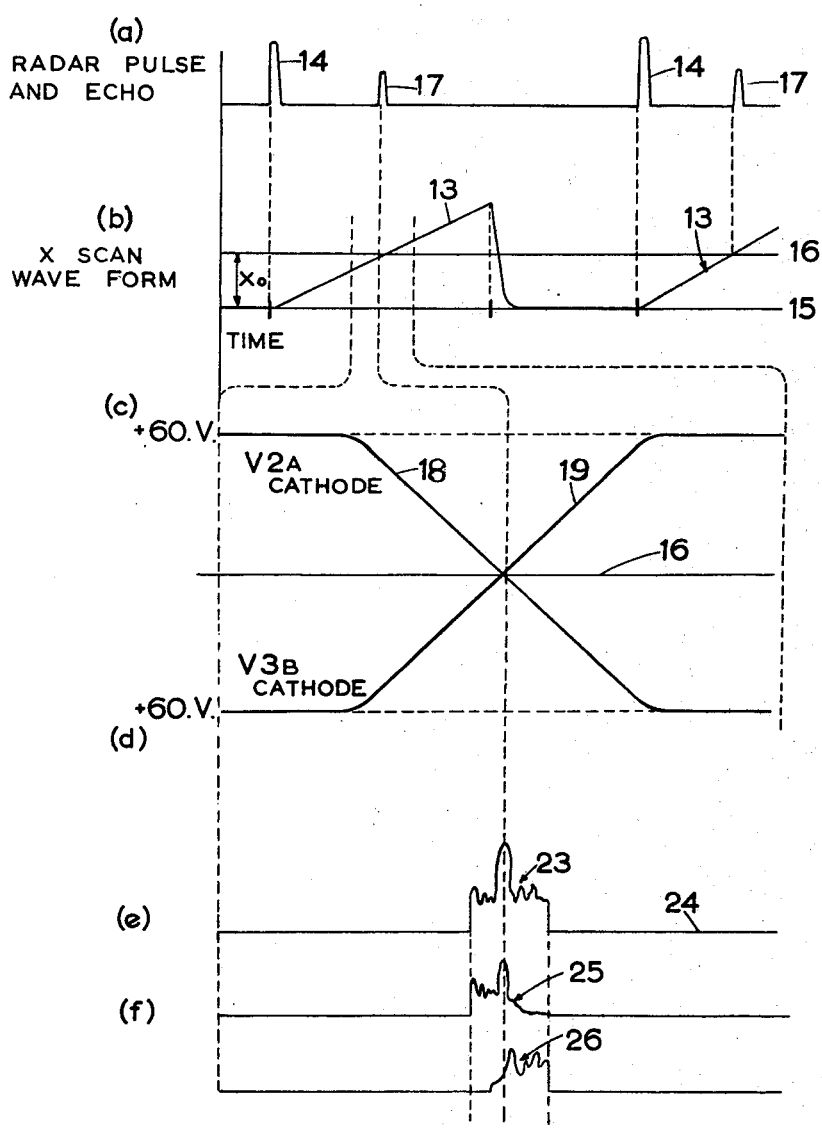

United States Patent Office 2,924,818
Patented Feb. 9, 1960

2,924,818
AUTOMATIC TRACKING CIRCUITS

Eric Lawrence Casling White, Iver, England, assignor to Electric & Musical Industries Limited, Middlesex, England, a company of Great Britain Application March 2, 1954, Serial No. 413,578

Claims priority, application Great Britain February 21, 1953

5 Claims. (Cl. 343—7.3)

This invention relates to the design of automatic tracking arrangements for use with search radars.

In one form of search radar, a radar beam which is sharply defined in azimuth is rotated continuously about a vertical axis, this form of radar being associated usually with P.P.I. displays. With such radars, the position of a target (neglecting height) is basically defined by the bearing angle of the beam and the time delay of the echo, which is directly proportional to range, i.e. in essentially Polar co-ordinate $r$, $\theta$. This is illustrated by the fact that in many cases the cathode ray tube for giving the P.P.I. display utilises magnetic deflection with a single coil carrying a current which is zero at the instant of emission of each radar pulse, and then increases linearly, the coil being rotated about the axis of the cathode ray tube in synchronism with the radar aerial rotation. Similarly, it has been usual in automatic tracking arrangements coupled to such radars to generate range and bearing gates and to define echo (i.e. target) positions by coincidence of these gates. However, the requirements of several parallel connected displays can be more easily met by designing the P.P.I.'s with two fixed deflecting coils at right angles to each other, and supplying $x$ and $y$ deflections proportional to $r \cos \theta$ and $r \sin \theta$ respectively. This technique becomes essential with the introduction of interlaced "continuous" markers. In such a system the beam in the cathode tube is deflected between radar scans successively to one or more marker positions.

The present invention is based on the principle that where conversion is made to Cartesian co-ordinates for the purpose of the P.P.I. display, advantage can be derived from using Cartesian co-ordinates for generating pulses for gating radar echoes to the error sensing means of the automatic tracking arrangement.

Therefore, according to the present invention there is provided a radar automatic tracking arrangement in which gating pulses for gating radar echoes to error sensing means are generated by means which operate in Cartesian co-ordinates.

A preferred feature of the present invention consists of the fact that the gating pulses are such as to define a gate which is offset from the predicted mean position of an echo and which is caused to traverse the echo at substantially the same rate and in the same sense as the radar scan. By virtue of this feature, a virtual arc-shaped gate is produced enclosing the radar echo, regardless of the orientation of the echo. It will be appreciated that if the gating pulses are arranged to define a square gate centered on the predicted echo position as would be natural when using Cartesian co-ordinates, each side of the gate would need to be at least as long as the echo arc and consequently the signal-to-noise ratio would tend to be adversely affected.

By generating the gating pulses for the radar echoes using Cartesian co-ordinates, the advantages are obtained that the channels for dealing with the different co-ordinates can be almost identical (as will hereinafter appear), thereby reducing the number of types of sub-units in the arrangement and facilitating design, manufacture, and maintenance. Moreover, a substantial reduction in the number of valves employed can be obtained compared with conventional automatic tracking circuits which operate in Polar co-ordinates, and a mechanical servo and magslip are not required, as in arrangements employing Polar co-ordinates, for defining the angular co-ordinate of the gate.

Figure 1B:
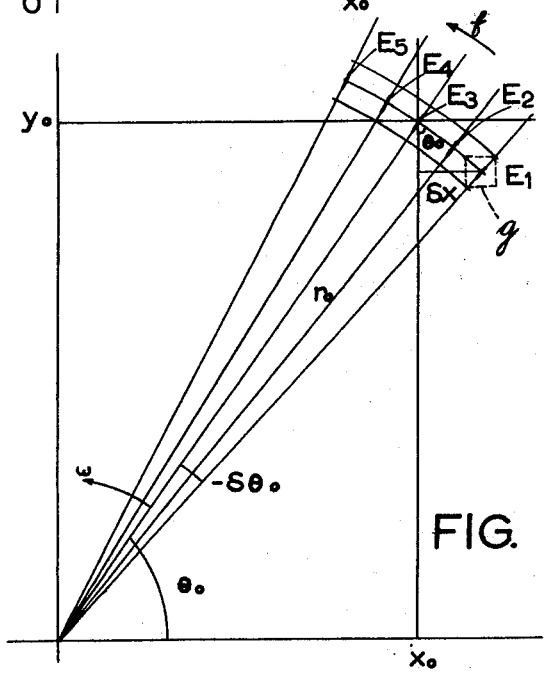
Figure 2A:
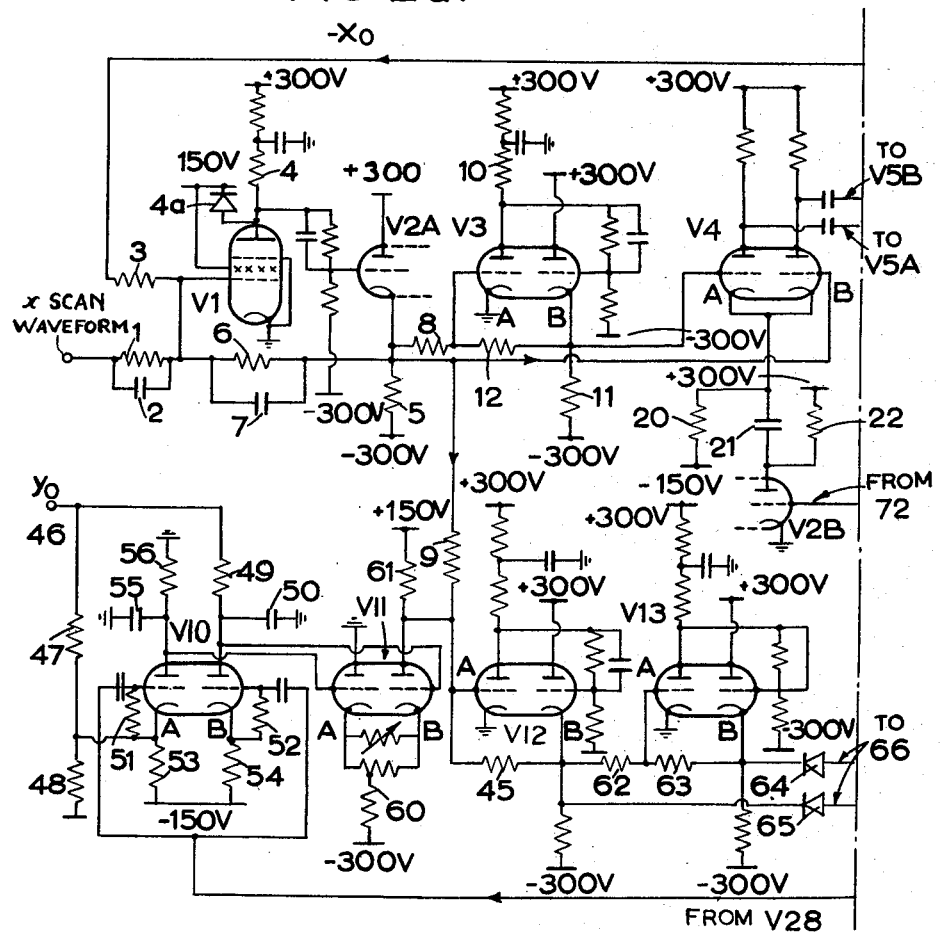
Figure 2B:
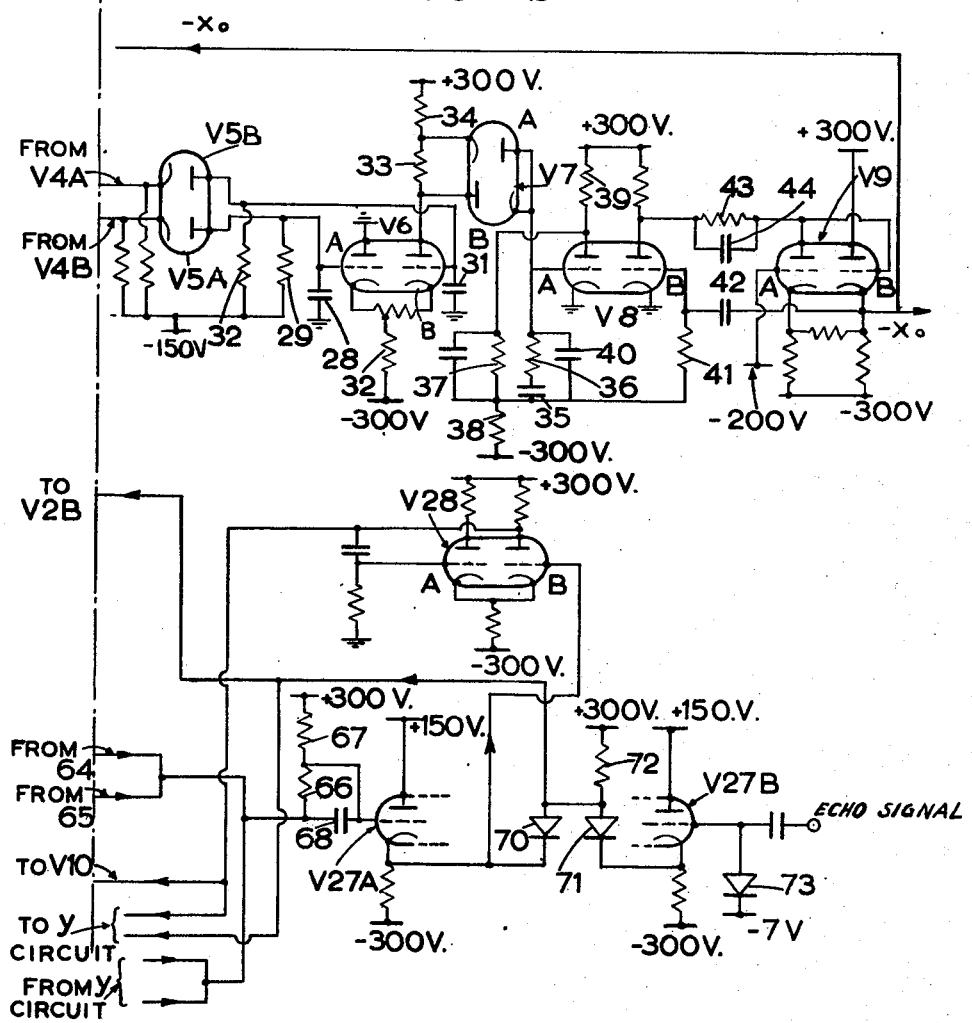
Figure 3B:
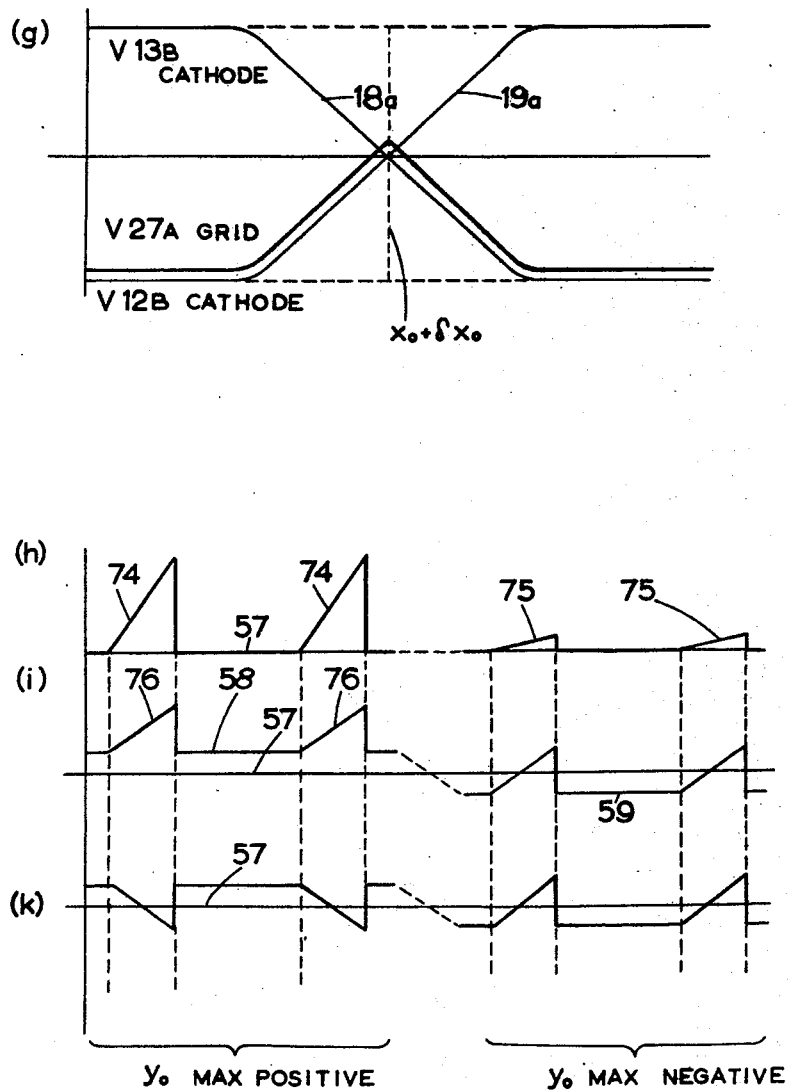

In order that the invention may be clearly understood and readily carried into effect, the invention will be described with reference to the accompanying drawings, in which:

Figures 1a and 1b consist of two explanatory diagrams,

Figure 2 illustrates diagrammatically the $x$ co-ordinate channel of an automatic tracking arrangement in accordance with one example of the present invention, two parts of this figure which are drawn on separate sheets being designated Figure 2a and Figure 2b respectively, and Figure 3 comprises graphs explanatory of the operation of Figure 2, two parts of Figure 3 which are drawn on separate sheets being designated Figure 3a and Figure 3b respectively.

Referring to the drawing, Figure 1(a) illustrates a P.P.I. representation of the portion of a radar scan occupied by the echo from a target. The representation is produced by deflecting the beam of the P.P.I. cathode ray tube in $x$ and $y$ directions by means of waveforms defined by the equations:

$$x = k (\cos \theta) t$$
$$y = k (\sin \theta) t$$

where $t$ represents time measured from the emission of each radar pulse, and $\theta$ represents the bearing angle of the aerial. The lines $OA_1$, $OA_2$ ... in Figure 1(a) represent successive radial traces produced by the $x$ and $y$ deflections of the beam and $E_1$, $E_2$ ... represent echo pulses which appear in these traces at range $r_0$ corresponding to $$\sqrt{x_0^2 + y_0^2}$$

The echo pulses cover an arc from $\theta_0 - \delta\theta_0$ to $\theta_0 + \delta\theta_0$, where $\theta_0$ is the mean echo bearing and $\pm \delta\theta_0$ is the effective beam width of the radar aerial. The area occupied by the echo formed by the group of pulses is a short arc of length $2r_0 \delta\theta_0$ and with thickness.

$$2\delta r = \frac{c \delta t}{2}$$

where $\delta t$ is the duration of each radar pulse and $c$ the velocity of light. If the error sensing means of the radar automatic tracking arrangement is to operate reliably, the signal gate for admitting echoes to the error sensing means must enclose the aforesaid area, together with some tolerance depending on the probable or possible misalignment of the echo and the gate. When the automatic tracking arrangement operates in Polar co-ordinates, it is relatively simple to increase the $r$ and $\theta$ dimensions of the gate by the amounts required to give this tolerance. However, when tracking in Cartesian co-ordinates, the natural form of gate is square and such a gate would require minimum dimensions of $$2\delta x_0 = 2\delta y_0 = 2r_0 \delta\theta_0$$

as shown in Figure 1(a) where FGHJ represents a suitable square gate. This minimum size is required to because the echo arc may have any orientation inside the gate. However, it is evident from Figure 1(a) that a square gate having these minimum dimensions has a considerably greater area than that occupied by the echo and its use would tend to reduce the signal-to-noise ratio of the arrangement and increase the danger of picking up unwanted targets. Further, the excess area is greatest at maximum range, just where any lowering of signal-to noise ratio is most disadvantageous.

This disadvantage is reduced in accordance with the invention by generating pulses which are such as to define a small gate such as $g$ Figure 1($b$) and of a size appropriate to admit only a single echo pulse. This small gate is initially offset from the predicted mean of the echo (as indicated by arrow $f$) at substantially the same rate and in the same sense as the radar scan, and thereby generate a virtual arc gate. In the automatic tracking arrangement to be described, a gating pulse is produced which defines a small square gate offset in azimuth from the position $x_0y_0$ (now assumed to represent the predicted mean position of the echo, rather than its actual position) by an amount of approximately half the beam width, and this gating pulse initiates the generation of a series of gating pulses in subsequent radial scans which are so timed as to traverse the small square gate over the echo. Referring to Figure 1($b$) it can be seen that the $x$ co-ordinate of the echo pulse $E_1$ is given by $$x = x_0 + \delta x = x_0 - r\delta\theta_0 \sin \theta_0$$

but $$r \sin \theta_0 = y_0$$

Therefore $$\delta x = -y_0 \delta\theta_0 \ldots \quad (1)$$

Similarly $$\delta y = x_0 \delta\theta_0$$

Therefore it will be apparent that the required offset of the small gate from the predicted mean position of the echo has an $x$ component proportional to $+y_0$ and a $y$ component proportional to $-x_0$ since $\delta\theta_0$ is the constant half beam width of the radar aerial. Moreover $\delta\theta_0$ is proportional to time, for $\omega$ constant, and to traverse the offset gate over the echo at the same rate and in the same sense as the radar scan the $x$ component of the offset has to be linearly varied at a rate proportional to $-y_0$ and similarly the $y$ component of the offset has to be linearly varied at a rate proportional to $+x_0$. As will hereinafter appear, the rate of movement of the offset gate is determined by integrating potentials proportional to $x_0$ and $y_0$ for a fixed time related to $\delta\theta_0$ and $\omega$.

Figure 2 illustrates a circuit for operating according to the principle described with reference to Figure 1. Certain parts of Figure 2 which are conventional, such as coupling and decoupling circuits will not be described specifically in order to simplify description. The circuit of the valves V1 and V2A constitute a summing and limiting amplifier. A waveform which varies as the $x$ scan is applied to the control electrode of the valve V1 via a series feed resistor 1 shunted by a capacitor 2 and the control electrode receives via feed resistor 3 a second input which (as will appear hereinafter) represents $-x_0$. A fragment of the $x$ scan waveform is represented in Figure 3, graph ($b$) by the line 13 which shows that the waveform has a sawtooth character and that a long flank is initiated on the emission of each radar pulse, two of which are represented by references 14 in Figure 3, graph ($a$). In Figure 3, graph ($b$) the voltage $x_0$ is represented by the vertical separation between the lines 15 and 16 and on adding $x$ and $-x_0$, the effect is to bias the $x$ scan waveform so as to cause it to pass through the zero axis, represented by 16, at a time representing $x_0$. Zero can be represented in practical circuits by any convenient datum voltage. Two echo pulses 17 are shown as being received at the times of the zero-intersections of waveform 13. The valve V1 has an anode load 4 in parallel with a catch diode 4$a$ and the potential set up across the load 4 is applied to the control electrode of the valve V2A which operates as a cathode follower by virtue of the cathode resistor 5. Negative feedback is provided from the cathode of V2A to the cathode of V1 via resistor 6 and capacitor 7. The summing amplifier therefore operates as a see-saw amplifier in which the resistors 1 and 6 are the see-saw resistors. (See the Journal of the Institution of Electrical Engineers, volume 93, part IIIA, page 303.) The output of the summing amplifier is derived from the cathode of the valve V2A and represents $x - x_0$ within limits set by the diode 4$a$ on the one hand and grid current on the other hand, and this output, represented by 18 (Figure 3, graph ($c$)) is applied in parallel to series feed resistors 8 and 9 and to the control electrode of a valve V4B. The feed resistor 8 leads to the control electrode of a valve V3A and the anode load 10 of this valve is coupled to the control electrode of valve V3B which has a cathode load resistor 11. This resistor is in turn coupled back to the control electrode of the valve V3A by resistor 12, so that the circuit of V3 operates as a see-saw amplifier having see-saw resistors 8 and 12. The amplifier operates with a gain of −1 and therefore the output at the cathode of V3B is the inverse of the waveform at the cathode of V2A, and is represented by 19 in Figure 3, graph ($c$). This inverse waveform is applied to the control electrode of the valve V4A. It will be seen that the time scale in Figure 3, graph ($c$) is considerably enlarged compared with Figure 3, graphs ($a$) and ($b$). It will be appreciated that the waveforms 18 and 19 intersect each other and the zero axis 16 at a time representing $x_0$.

The valves V4A and V4B have their cathodes coupled by resistor 20 and connected via capacitor 21 to the anode of a modulating valve V2B which has an anode resistor 22. The valve V2B is normally biassed to cut-off but (as will hereinafter appear) radar echoes falling within the area of a gate enclosing the predicted position of a target are admitted to the control electrode of the valve V2 with positive polarity and render the valve conducting. The wave-form 23 in Figure 3, graph ($d$) represents the anode current of V2B on receipt of an echo, the horizontal line 24 representing the anode current cut-off. The anode current of V2B is divided in different proportions to the anodes of the valves V4A and B, depending on the relative timing of the echo and its predicted position as represented by the cross-over of the waveforms 18 and 19, as illustrated in Figure 3, graphs ($e$) and ($f$), in which 25 and 26 represent possible anode currents in V4A and V4B. If the echo is not symmetrical about the intersection of 18 and 19, the magnitude and sign of the difference of the anode currents in valves V4A and V4B will represent the error in prediction. The resultant pulses at the anodes of V4A and V4B are lengthened by peak rectification in rectifying circuits consisting respectively of diode V5A, capacitor 28 and leak resistor 29, and diode V5B, capacitor 31 and leak resistor 32. The time constants of the peak rectifiers are such that the pulses transmitted through the diodes V5A and V5B are only smoothed approximately over the interval between successive radar pulses, so that the potentials across the capacitors 28 and 31 rapidly fall to zero after the radar scan passes the echo gate. The voltages set up across the capacitors 28 and 31 are differentially compared by means of the valves V6A and B which are cathode coupled by resistor 32. The valve V6B has an anode load consisting of resistors 33 and 34, resistor 33 being small compared with 34 and its opposite ends being connected via diodes V7A and V7B, to the control electrode of the valve V8A. The circuit of V8A constitutes a first error integrating circuit and it has an integrating capacitor 35 connected, in series with a resistor 36, between the control electrode of V8A and the junction of potential dividing resistors 37 and 38 connected between the anode of V8A and a negative potenial source, the valve V8A having an anode load resistor 39. The capacitor 35 and resistor 36 are shunted by a capacitor 40, resistor 36 and capacitor 40 being provided to give stability and smoothing to the integrator. The diodes V7A and V7B function as an electronic switch which is normally open and is closed only during the occurrence of echo gating pulses so as to ease the requirement on the zero stability of the integrator. In the interval between gating pulses, V2B (as aforesaid) is non-conducting, and this condition corresponds to a predetermined potential drop across the resistors 33 and 34. The control electrode V8A is a low impedance point whose potential does not vary substantially with the applied signals and its operating potential lies between the potentials at opposite ends of resistor 33. In this condition V7A and B are both non-conducting. However, when V2B is gated to the conducting condition, potential variations induced at the anode of V6B by echo signals exceeding a predetermined minimum level can be transmitted through either V7A or B to the integrating circuit.

The circuit shown employs linear prediction, that is the prediction of the $x$ co-ordinate of the echo at the next scan is based on the assumption that the velocity of the target remains unchanged during the interval of prediction. Any error of prediction can therefore be taken as representing acceleration of the target, and assuming that the correct initial conditions have been established in the circuit, the integral of the error can be taken as representing velocity, namely $\dot{x}$ in the case being described. In practice, switch means are provided for conditioning the circuit so that it can be "put-on" to a target, thereby establishing the appropriate initial conditions. The technique of "putting-on" is known to those skilled in the art and since it forms no part of the invention, the "putting-on" means of the illustrated automatic tracking circuit have not been shown.

The output of the V8A integrating circuit thus represents $\dot{x}_0$, the rate of change of $x_0$ and this output is applied via resistor 41 to the control electrode of valve V8B. This latter valve is associated with the valves V9A and V9B in a second integrator which converts $\dot{x}_0$ to $x_0$. The integrating capacitor of this circuit is 42 and it is connected from the cathode of V9B to the control electrode of V8B. The integrating feedback loop is completed by the coupling from the anode of V8B to the control electrode of V9B through resistor 43 and capacitor 44. An internal positive feedback loop is provided by V9A so as to give the required relatively large output voltage swing, stability of the integrator being ensured by the overall negative feedback. The output voltage $x_0$ of the second integrator is derived from the cathode of V9B and applied, as aforesaid, to the resistor 3; it is also applied, as will hereinafter appear, to the $y$ coordinate gating pulse generator.

The voltage waveform 18 applied to the feed resistor 9, forms one input to a see-saw amplifier including valves V12A and B. This amplifier has a feedback resistor 45 so that the resistors 9 and 45 constitute the see-saw resistors, the other connections of the amplifier being conventional. A second input is, however, applied to the control electrode of V12A consisting of an off-setting signal derived from the anode of a valve V11B. This off-setting signal is generated under the control of an input voltage representing $y_0$ the predicted $y$ co-ordinate of the echo. The voltage $y_0$ is generated in a $y$ co-ordinate channel identical to the $x$ co-ordinate channel from the valves V1 to V9. The voltage $y_0$ appears at terminal 46 and a fraction of it, determined by potential dividing resistors 47 and 53, is applied to the cathode of a valve V10A. The potential at 46 is also applied to an integrating circuit consisting of a resistor 49 and capacitor 50, the junction of 49 and 50 being connected to the anode of a valve V10B. Valves V10A and B have their control electrodes connected to their cathodes by resistors 51 and 52 so that they are normally conducting but they are periodically rendered non-conducting by negative pulses applied from a monostable multivibrator of known construction, consisting of the double valve V28 and the connections thereto. The cathodes V10A and B are connected to a negative potential source (as shown) by resistors 53 and 54, and a capacitor 55 having a leak resistor 56 is connected to the anode of V10A. When V10B is conducting a fixed potential is maintained at its anode connected to 50. This potential is taken as representing zero and is denoted in Figure 3, graphs ($h$) to ($k$) by 57. Figure 3, graphs ($h$) and ($j$) illustrate respectively the waveforms at the anodes of V10B and V10A. When V10A is conducting the potential at its anode is maintained at a value proportional to $y_0$, lying above or below 57 depending on whether $y_0$ is positive or negative. In Figure 3, graph ($j$) 58 represents the maximum positive potential at the anode of V10A while 59 represents the maximum negative potential. The valves V11A and B, which are cathode coupled by resistor 60, form a comparison circuit and the output set up across the anode resistor 61 of V11B is the potential at the anode of V10A minus the potential at the anode of V10B. Therefore when V10A and B are conducting, a potential proportional to $y_0$ (e.g. 58) is applied to the control electrode of V12A. The potential proportional to $y_0$ has the effect of biassing the waveform 18 positively or negatively according as $y_0$ is positive or negative and therefore of displacing the zero intersection of the waveform 18 to left or right, as seen in Figure 3, graph ($c$). That is the zero-intersection of the waveform 18 is offset to produce the waveform 18$a$. Moreover the circuit parameters are chosen to give an offset such that the zero-intersection represents not $x_0$, but $x_0 + \delta x_0$, the desired $x$ co-ordinate of the offset gate in its initial position.

The required offset $x_0$ is proportional to $y_0$ as pointed out in Equation 1 of the description relative to Figure 1. The conducting state of the valves V10A and V10B is the quiescent state and when they are rendered non-conducting, namely when the radar scan reaches the co-ordinates $x_0 + \delta x_0$, $y_0 - \delta y_0$ the valves operate to produce a variation of the offset, that is of $\delta x_0$ at a rate proportional to $-y_0$, in accordance with the requirement explained with reference to Figure 1.

The offset waveform 18$a$ is phase inverted in the cathode of the valve V12B in Figure 3, graph ($g$) to produce the waveform 19$a$, and is again phase inverted in a further see-saw amplifier comprising valves V13A and V13B and see-saw resistors 62 and 63, to reproduce the waveform 18$a$. The two offset waveforms have a common zero intersection at a time representing $x_0 + \delta x_0$ as shown in Figure 3, graph ($g$) and they are applied to diodes 64 and 65 which are poled as shown and have bleed resistors 66 and 67 in series connected to a positive potential source. The potential across the resistors 66 and 67 is applied via capacitor 68 to the control electrode of a valve V27A and the polarity of the didoes 64 and 65 is such that the potential at the control electrode of the valve V27A will tend to follow the more negative of the potentials applied to the diodes 64 and 65. The control electrode potential of the valve V27A will therefore tend to follow the waveform represented by the thickened line 69 in Figure 3, graph ($g$). This is the $x$ gate waveform, and (neglecting the $y$ gate waveform) it is applied via valve V27A, which is a cathode follower, to a double diode gate consisting of diodes 70 and 71 having a bleed resistor 72. The diode 70 has its cathode connected to the cathode of V27A and the cathode of diode 71 is connected to the cathode of a further cathode follower valve V27B, to the control electrode of which radar echoes are applied with positive polarity. The control electrode of the valve V27B is maintained as a bias of the order of $-7$ volts by connection through a diode 73 to a suitable negative potential source. The polarity of the diodes 70 and 71 is such that the potential across resistor 72 will follow the more negative potential at the cathodes of V27A and B. Radar pulses can therefore only be passed through the diode gate when the cathode potential at V27A rises above −7 volts. This it tends to do near the centre of the cusp in the waveform 69 corresponding to the zero-intersections of the waveforms 18a and 19a. In actual fact the x gate waveform never exists by itself as the waveforms 18a and 19a are combined with similar waveforms from the y gate generating circuit via further diodes like 64 and 65. Therefore the cathode potential of V27A only rises above −7 volts on coincidence of cusps in the x gate waveform and the y gate waveform. It will now be clear that such coincidence will occur at the position having the co-ordinates $x_0+\delta x_0$, $y_0-\delta y_0$. The waveform 69 represents the instantaneous modulus of the waveform 18a and as explained in copending British Patent Specification No. 763,576, the gating pulses are generated by deriving the greater of the instantaneous moduli of the waveform 18a and the corresponding y scan waveform. The width of the horizontal "slice" of the waveform 69 selected for forming the gating pulse (in combination with the corresponding waveform from the y gate generating circuit) is adjustable by the ratio of 66 to 67, which controls the bias on V27A. When a gating pulse is produced, radar echoes are passed to V2B to initiate error sensing as above described.

The cathode of the valve V27A is connected to the control electrode of valve V28B and this has the effect of changing the multivibrator from its stable to its unstable state at the centre of the cusp in the waveform 69 that is at the position $x_0+\delta x_0$, $y_0-\delta y_0$ and as will appear in the following this initiates a variation of the "bias" potential applied from the anode of V11a to the control electrode of V12a, the variation lasting for an interval related to the time taken by the beam to sweep an arc corresponding to the width of the radar beam, namely the time duration of the required virtual arc gate. Thus when the state of the multivibrator is changed, it produces a negative pulse which is applied to the control electrodes of the valves V10A and V10B, switching off those valves. The potential $y_0$ is then integrated into the capacitor 50 and the datum potential 57 (Figure 3, graph (h)) is selected so that both positive and negative values of $y_0$ produce a rise in potential across 50. The lines 74 in Figure 3, graph (h) represent the integral when $y_0$ has its maximum positive value and the lines 75 represent the integral when $y_0$ has its maximum negative value. At the same time the potential across the capacitor 55 rises at a substantially constant rate, due to leakage through resistor 56 and produces potential variations such as denoted by the lines 76 in Figure 3, graph (j). The time constant of 55 and 56 is arranged to be such that the lines 76 represent the potential which would be set up across the capacitor 50 during the integrating period when voltage $y_0=0$. On forming the difference between the waveforms depicted in graphs (h) and (j) by V11A and V11B, a potential is produced at the anode of the valve V11B which varies at a rate proportional to $-y_0$ and has a starting level proportional to $+y_0$, whether $y_0$ is positive or negative. Representative waveforms at the anode of V11B are shown in Figure 3, graph (k). The period of integration, determined by the time constant of the multivibrator V28, is arranged to be proportional to the width of the radar beam, having in fact the duration $2\delta\theta_0/\omega$ (that is the time taken by the beam to sweep an arc $2\delta\theta_0$ corresponding to the width of the radar beam) together with some tolerance to allow for misalignment of echo and gate, and at the end of this time the multivibrator reverts to its stable state, and V10A and B again conduct. The waveforms 74 and 76 are generated once per radar scan and have a duration corresponding only to the arc length of the required gate, and they are centered on the position $x_0$, $y_0$, the predicted mean position of the echo. The valves V10a and V10b revert to their quiescent or initial states after the generation of each virtual arc gate and re-establish the initial offset $x_0$ in readiness for the next scan of the target. The effect of the potential variation set up at the anode of V11B is to vary the x component of the offset at a rate and in a sense corresponding to that at which the radar scan sweeps across the echo. A similar effect is produced in the y gate generating circuit and as a consequence a series of coincident zero-intersections by the waveform 18a and the corresponding y co-ordinate waveform are produced, defining positions corresponding for example to the pulses $E_2$, $E_3$, $E_4$, $E_5$, in Figure 1(b). Therefore the gate defined by the first coincidence of the x and y gating pulses is caused to traverse the echo as desired and generate a virtual arc gate as indicated in Figure 1(b). The bias level for the radar echoes applied to the control electrode of the valve V27B is predetermined to produce the desired width for the virtual arc gate and the "arc" length of the gate is determined by the constants of the multivibrator V28. If $\omega$ varies appreciably it will require to be compensated in two ways, (1) inversely proportional alteration of the sawtooth generator time constants, and (2) inversely proportional alteration of the length of the negative pulse produced by V28.

What I claim is:

1. A radar automatic tracking arrangement comprising error sensing means, an input circuit for radar echo signals, means for deriving a first periodic waveform of which the value at different times corresponds to different values of one rectangular co-ordinate, means for deriving a second periodic waveform to which the value at different times corresponds to different values of another rectangular co-ordinate, means for deriving signals at times which on the scale of said waveforms represent the rectangular co-ordinates of a point, means responsive to said signals for generating successive series of pulses at times which on the scale of said waveforms represent the rectangular co-ordinates of a series of points defining a virtual arc, and means responsive to said pulses for gating echo signals from said input circuit to said error sensing means.

2. A radar automatic tracking arrangement comprising error sensing means, an input circuit for radar echo signals, means for deriving a first periodic waveform of which the value at different times corresponds to different values of one rectangular co-ordinate, means for deriving a second periodic waveform of which the values at different times correspond to different values of another rectangular co-ordinate, means for deriving a third waveform which repeatedly intersects a reference value at times which on the scale of the first waveform represent one value of said first co-ordinate, means for deriving a fourth waveform which repeatedly intersects a reference value at times which on the scale of said second waveform represent one value of said second co-ordinate, means responsive to coincident intersections of said reference values by said third and fourth waveforms for displacing said third and fourth waveforms to produce a series of coincident intersections of said reference values by said third and fourth waveforms at times which on the scale of said first and second waveforms represent rectangular co-ordinates of a series of points defining a virtual arc, means for deriving gating pulses responsive to coincident intersections, and means for gating echo signals from said input circuit to said error sensing means in response to said gating pulses.

3. An arrangement according to claim 2, said error sensing means comprising a modulator, means for feeding said first waveform to said modulator, a second modulator, means for feeding said second waveform to said second modulator, and means for feeding echo signals to said modulators to modulate said first and second waveforms respectively.

4. A radar automatic tracking arrangement comprising error sensing means, an input circuit for radar echo signals, means for predicting the values of the x and y co-ordinates of the mean position and echo, means for deriving a first periodic waveform at which the value at different times corresponding to different values of one rectangular co-ordinate, means for deriving a second periodic waveform at which the value at different times corresponds to different values of another rectangular co-ordinate, means for deriving a third waveform which repeatedly intersects a reference value at times which on the scale of said first waveform represent an $x$ co-ordinate value offset from the predicting $x$ co-ordinate value by an amount proportional to the predicting $y$ co-ordinate value, means for deriving a third waveform which repeatedly intersects a reference value at times which on the scale of said second waveform represents a $y$ co-ordinate value offset from said predicted $y$ co-ordinate value by an amount proportional to the negative of said predicted $x$ co-ordinate value, means responsive to coincident intersections of said reference values of said third and fourth waveforms for displacing said third waveform at a rate proportional to the negative of said predicted $y$ co-ordinate value and for displacing said fourth waveform at a rate proportional to said predicted $x$ co-ordinate value, to produce a series of coincident intersections of said reference values by said third and fourth waveforms at times which on the scale of said first and second waveforms represent the $x$ and $y$ co-ordinates of a series of points defining a virtual arc, means for deriving gating pulses responsive to said coincident intersections, means for gating echo signals from said input circuit to said error sensing means in response to said gating pulses, said predicting means being responsive to the output of said error sensing means for predicting the values of the $x$ and $y$ co-ordinates of the mean position of an echo.

5. An arrangement according to claim 4, said means for displacing said third and fourth waveforms comprising means for deriving a first potential proportional to the negative of the predicted $x$ co-ordinate value, means for integrating said first potential within a predetermined time interval, means for deriving a second potential proportional to said predicted $y$ co-ordinate value, means for integrating said second potential within a predetermined time interval, means for superimposing the integral of the first potential as a variable bias on said second waveform to displace said waveform, and means for superimposing the integral of said second potential as a variable bias on said first waveform to displace said first waveform.

References Cited in the file of this patent

UNITED STATES PATENTS

| | | |
|---|---|---|
| 2,532,063 | Herbst | Nov. 28, 1950 |
| 2,581,438 | Palmer | Jan. 8, 1952 |
| 2,581,589 | Herbst | Jan. 8, 1952 |
| 2,606,318 | Haworth et al. | Aug. 5, 1952 |